US011093838B2

(12) United States Patent
McCann et al.

(10) Patent No.: US 11,093,838 B2
(45) Date of Patent: Aug. 17, 2021

(54) ADAPTIVE SELECTION OF USER TO DATABASE MAPPING

(71) Applicant: MICROSOFT TECHNOLOGY LICENSING, LLC, Redmond, WA (US)

(72) Inventors: Michael James McCann, Bothell, WA (US); Randee Bierlein Wallulis, Snohomish, WA (US); Parthipan Thayanithy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1042 days.

(21) Appl. No.: 15/591,801

(22) Filed: May 10, 2017

(65) Prior Publication Data

US 2018/0330243 A1 Nov. 15, 2018

(51) Int. Cl.
*H04L 29/08* (2006.01)
*G06N 5/04* (2006.01)
*G06F 16/9537* (2019.01)
*G06F 9/50* (2006.01)
(Continued)

(52) U.S. Cl.
CPC ............. *G06N 5/04* (2013.01); *G06F 9/5061* (2013.01); *G06F 16/9537* (2019.01); *G06F 30/20* (2020.01); *H04L 67/1004* (2013.01); *H04L 67/1097* (2013.01); *G06F 2111/10* (2020.01);
(Continued)

(58) Field of Classification Search
None
See application file for complete search history.

(56) References Cited

U.S. PATENT DOCUMENTS 7,676,516 B2 * 3/2010 Boukobza ........... H04L 67/1002
707/713
8,762,323 B2 6/2014 Moon et al.
9,081,624 B2 * 7/2015 Liu ....................... G06F 9/5088
(Continued)

FOREIGN PATENT DOCUMENTS

WO 2004036344 A2 4/2004

OTHER PUBLICATIONS

You, et al., "Scalable Load Balancing in Cluster Storage Systems", In Proceedings of 12th International Middleware Conference, Dec. 12, 2011, pp. 100-119.
(Continued)

*Primary Examiner* — Cai Y Chen
(74) *Attorney, Agent, or Firm* — Michael Best & Friedrich LLP

(57) ABSTRACT

Technologies are described for adaptive selection of user to database mapping. An impact to processing resources by a user of a database managed by the processing resources may be predicted using criteria based on user-database properties such as a number of rows in database, a number of rows in database for the user, a maximum depth of hierarchy for the user, a maximum breadth of hierarchy for the user, applications that have recently accessed the user's data, distribution of quota types in the user's data, a number of shared items in the user's hierarchy, a number of people who share in the user's shared item hierarchy, an application employed by the user to access the data currently, etc. Based on a model for the predicted impact, a behavior change (for any of the criteria) and/or a move of the user to another database may be suggested/automatically implemented.

18 Claims, 7 Drawing Sheets

(51) Int. Cl.
*G06F 30/20* (2020.01)
*G06F 111/10* (2020.01)

(52) U.S. Cl.
CPC .......... *G06F 2209/508* (2013.01); *G06F 2209/5019* (2013.01)

(56) References Cited

U.S. PATENT DOCUMENTS

| | | | |
|---|---|---|---|
| 9,286,571 B2 | 3/2016 | Cao et al. | |
| 2007/0271570 A1* | 11/2007 | Brown | G06F 9/5033 718/105 |
| 2008/0065574 A1 | 3/2008 | Hu | |
| 2008/0222646 A1 | 9/2008 | Sigal et al. | |
| 2009/0034367 A1* | 2/2009 | Sherrill | G01V 1/247 367/47 |
| 2009/0037367 A1 | 2/2009 | Wein | |
| 2011/0055368 A1 | 3/2011 | Colrain et al. | |
| 2012/0066363 A1* | 3/2012 | Somogyi | G06F 16/2358 709/223 |
| 2013/0151683 A1* | 6/2013 | Jain | G06F 3/0646 709/223 |
| 2014/0211698 A1 | 7/2014 | Aguirre et al. | |

OTHER PUBLICATIONS

Bogaert, Sammy, "Load Balance your Exchange Mailboxes across Databases on one or multiple servers", https://boerlowie.wordpress.com/2010/10/05/load-balance-your-exchange-mailbox-databases-over-one-or-multiple-servers/, Published on: Oct. 5, 2010, 6 pages.

Chong, et al., "Multi-Tenant Data Architecture", https://msdn.microsoft.com/en-us/library/aa479086.aspx, Published on: Jun. 2006, 15 pages.

Revar, et al., "Load Balancing in Grid Environment using Machine Learning—Innovative Approach", In International Journal of Computer Applications, vol. 8, Issue 10, Oct. 2010, pp. 31-34.

"International Search Report and Written Opinion Issued in PCT Application No. PCT/US18/026992", dated Jul. 6, 2018, 15 Pages.

\* cited by examiner

ADAPTIVE SELECTION OF USER TO DATABASE MAPPING

BACKGROUND

Increased usage of online services such as collaboration services, cloud storage services, and comparable ones has led to widespread online service providers. Datacenters hosting large numbers of servers provide the hardware framework for applications, platforms, and data storage. Some applications or services are associated with databases. User data may be stored and retrieved from various types of databases through servers configured to manage those databases.

Resource consumption, for example, processor usage is, one of the metrics watched for by the service providers. Over may degrade user experience. Service providers may also charge based on resource consumption. Thus, systems are developed to monitor and adjust resource consumption without imparting user experience (or improving user experience). Conventional systems typically select a number of active users at random and move them to a less busy server to achieve optimal balancing. Selection may also be made based on historical data analysis, but neither approach may provide desired accuracy for a system based on current usage.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to adaptive selection of user to database mapping. In some examples, a processing consumption of a database user may be determined based on one or more criteria associated with the user and the database. A model may be generated based on user, processing consumption, and database usage. The model may be used to determine one or more of providing a behavior change suggestion and moving the user to another database. The suggestion may then be provided to the user and/or the user may be moved to the other database.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
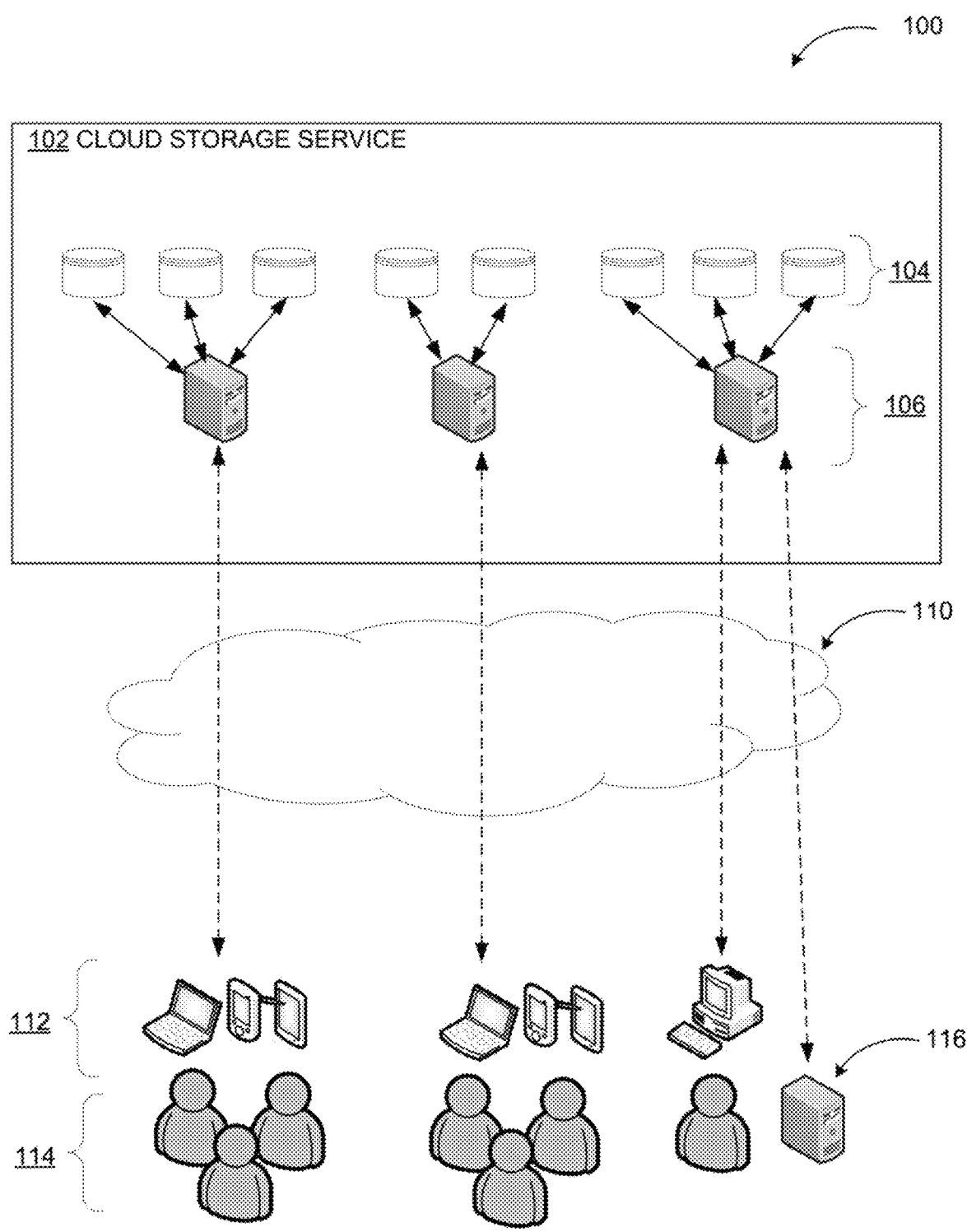
FIG. 1 includes an example network environment where adaptive selection of user to database mapping may be implemented.

As briefly described above, embodiments are directed to adaptive selection of user to database mapping. According to some examples, an impact to processing resources (e.g., processors of a server) by a user of a database managed by the processing resources may be predicted based on a number of criteria. The criteria may be based on user-database properties such as a number of rows in, database (total), a number of rows in database for the user, a maximum depth of hierarchy for the user, a maximum breadth of hierarchy for the user, applications that have recently accessed the user's data, distribution of quota types in the user's data, last read time for the user, a number of shared items in the user's hierarchy, a number of people who share in the users shared item hierarchy, an application employed by the user to access the data currently, etc. Based on a model for the predicted impact, a behavior change (for any of the criteria) and/or a move of the user to another database may be suggested/automatically implemented.

While embodiments are described herein using an example system of a cloud storage service managing databases for users (subscribers), they are not limited to the example configurations. Adaptive selection of user to database mapping may be implemented in other system configurations such as collaboration services, communication services that provide access to data, productivity services with storage capability, for example. Furthermore, the example criteria and configurations discussed herein are not intended to be limiting examples. Other criteria and configurations to determine processing resource impact and determine behavior change suggestions or move may be implemented using the principles described herein.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction, with an application program that runs on an operating system on a personal computer, those skilled n the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for adaptive selection of user to database mapping. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where adaptive selection of user to database mapping may be implemented.

As illustrated in diagram 100, an example system may include cloud storage service 102 (hosted at a datacenter, for example). The cloud storage service may include any number of servers 106 managing data stores such as databases 104. Each server may be assigned varying numbers of databases depending on hardware configuration, usage demand, software configuration, amount of data stores, etc.

Users 114 (subscribers of the cloud storage service 102) may access the stored data through locally installed applications or browsers on various computing devices 112. In addition to human users, applications (e.g., executed on a server) may also access the data stored by the cloud storage service 102. The users 114 may access the data for a variety of purposes. Depending on the application type, data may be queried, modified, new data generated, shared with other users, etc. The applications may include productivity applications, collaboration applications, communication applications, and other types. The computing devices 112 may include a desktop computer, a laptop computer, a tablet computer, a smart phone, a wearable computing device, and others. The computing devices 112 may communicate with the servers 106 of the cloud storage service 102 via one or more networks 110. As described herein, the cloud storage service 102 and/or its components may be implemented as software, hardware, or combinations thereof.

Embodiments as described herein, allow adaptive selection of user to database mapping. The accurate and efficient balancing of resource consumption based on user database interactions and properties may reduce processing and memory resources, reduce consumed bandwidth, and increase user interactivity.

Embodiments, as described herein, address a need that arises from very large scale of operations created by software-based services that cannot be, managed by humans. The actions/operations described herein are not a mere use of a computer, but address results of a system that is a direct consequence of software used as a service offered in conjunction with large numbers of users accessing data stored in databases.

Figure 2A:
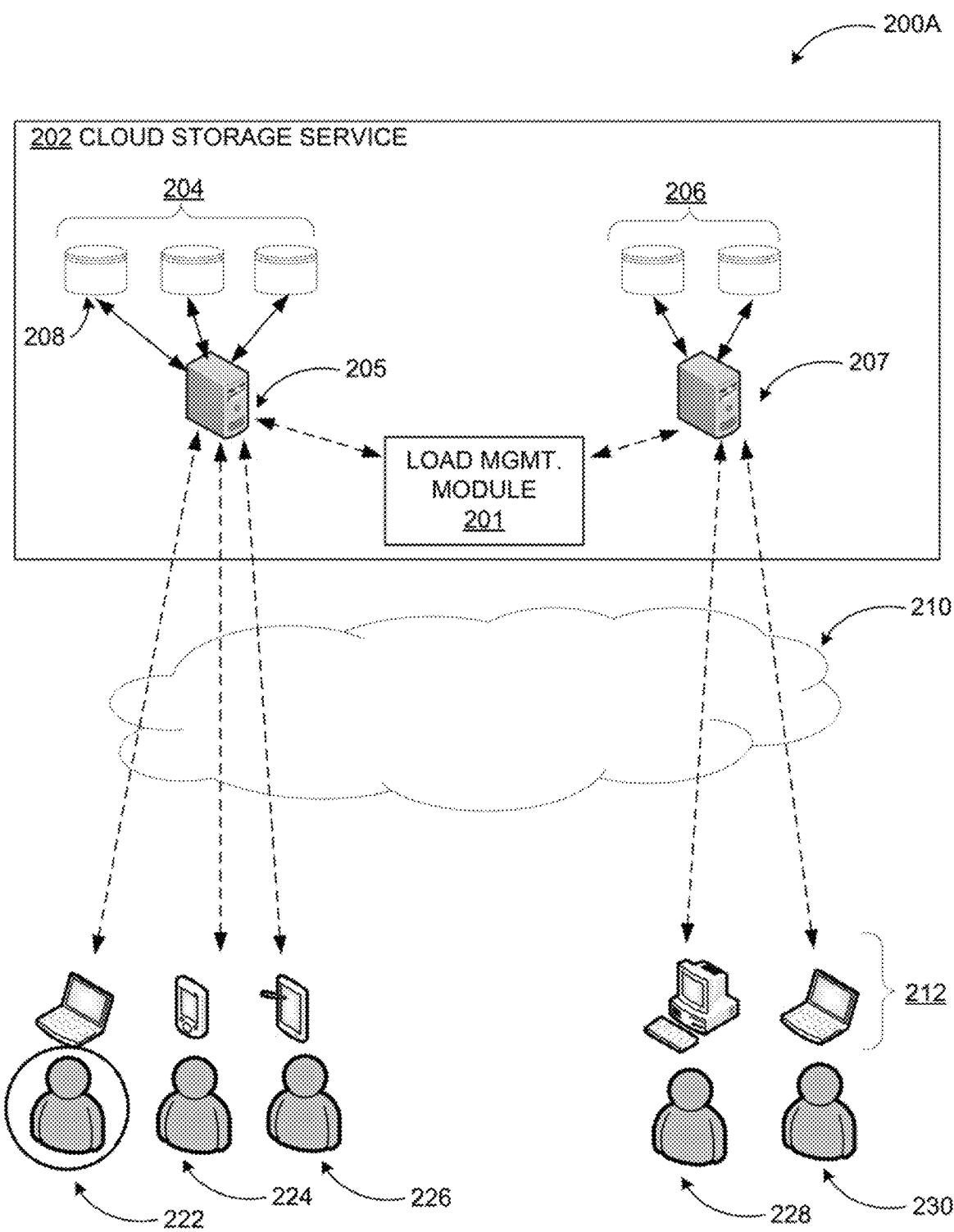
FIG. 2A includes a display diagram illustrating conceptually selection of a user to be moved in a system employing adaptive selection of user to database mapping.

FIG. 2A includes a display diagram illustrating conceptually selection of a user to be moved in a system employing adaptive selection of user to database mapping.

Diagram 200A shows an example configuration, where a server 205 of the cloud storage service 202 is configured to manage databases 204. Another server 207 is configured to manage fewer number of databases 206. Users 222, 224, and 226 may be assigned to the databases 204 managed by the server 205. Users 228 and 230 may be assigned to databases 206 managed by the server 207. The users may access their data through applications executed on computing devices 212 via network(s) 210. A load management module 201 of the cloud storage service 202 (or any other component) may monitor processing capacity and usage of the servers 205, 207 and move users between the servers or suggest behavior changes to the users if one of the servers is becoming overused.

For example, the load monitoring module 201 may take into account user-database properties such as a number of rows in database (total), a number of rows in database for the user, a maximum depth of hierarchy for the user, a maximum breadth of hierarchy for the user, applications that have recently accessed the user's data, distribution of quota types in the user's data, last read time for the user, a number of shared items in the user's hierarchy, a number of people who share in the uses shared item hierarchy, an application employed by the user to access the data currently, etc. in determining processing resource impact (e.g., CPU usage) on the servers.

In an example scenario, the load monitoring module 201 may determine that server 205 is overused (from a processing capacity perspective). Based on the criteria above or additional criteria, the load management module 201 may also determine that user 222 is the culprit (compared to the usage of the other users). Thus, load management module 201 may suggest behavior changes such as using a different application to access the data, modifying the distribution of quota types in the user's data, the number of shared items in the user's hierarchy, the number of people who share in the user's shared item hierarchy, the number of rows in database 208 for the user 222, the maximum depth of hierarchy for the user, the maximum breadth of hierarchy for the user, etc.

If the user 222 is not willing to or cannot perform the suggested behavior changes to reduce the processing resource impact on server 205, a decision may be made to move the user to server 207 with more available processing capacity. In some embodiments, the user 222 may be moved and may perform some or all of the suggested behavior changes. For example, the cloud storage service 202 may provide the user with financial or other incentives to reduce their impact on the servers. The move and/or the behavior changes may accomplish the reduction in the impact.

Figure 2B:
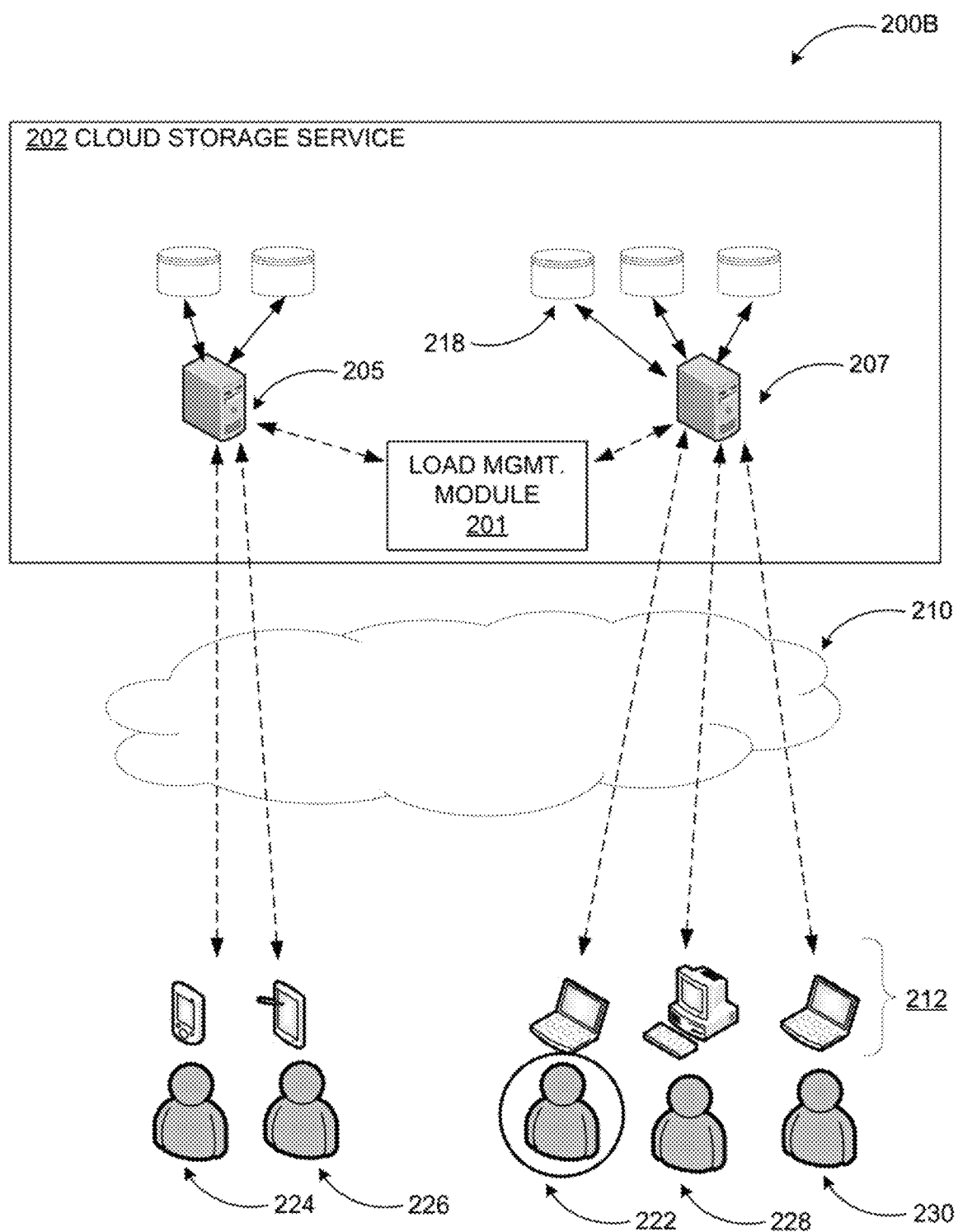
FIG. 2B includes a display diagram illustrating conceptually moving of a user to be moved in a system employing adaptive selection of user to database mapping.

FIG. 2B includes a display diagram illustrating conceptually moving of a user to be moved in a system employing adaptive selection of user to database mapping.

Diagram 200B shows the move option. Upon determining that moving user 222 to server 207 may reduce the strain on server 205 without overly impacting server 207, the load management module 201 may move the user's data to server

207. The user's data may be stored in one of the existing databases of server 207 or a new database 218 associated with the server 207.

Figure 3:
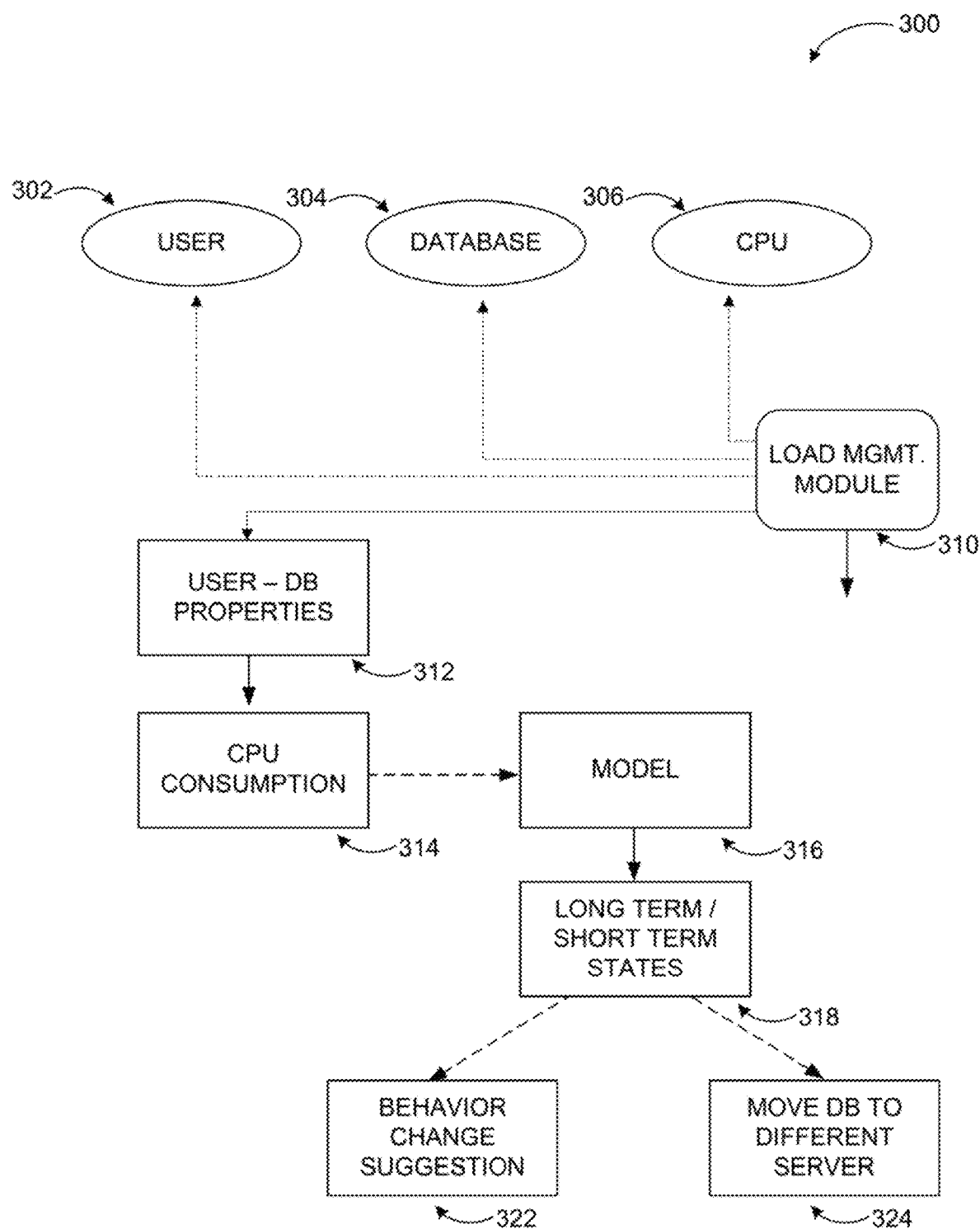
FIG. 3 includes a display diagram of major components and actions in providing adaptive selection of user to database mapping.

FIG. 3 includes a display diagram of major components and actions in providing adaptive selection of user to database mapping.

As shown in diagram 300, a load management module 310 of a cloud storage service may monitor interactions between a user 302, a database 304, and a processor 306 to determine an impact of the user's interactions with the database on the processor and mitigate overloading of the processor 306. In multi-server multi-database environment, the load management module 310 may aim for balancing processing consumption across the databases and machines that host them. The goals for the load management module 310 may include identification of high processing consumption users so that a minimal set of users can be moved to other server reducing a cost of balancing and determination of how much processing consumption can be attributed to users so that a desired amount of processing consumption can be moved.

Using machine learning approaches or similar algorithms, the load management module 310 may analyze user-database properties 312 as described above, monitor processing resource consumption 314 (for each server) and generate a processing consumption impact model 316. The model 316 may be used to determine long term and short term states 318. If processing consumption spikes due to a short term effect, it may not make sense to move a user because of the short term impact. If the impact is longer term, however, a move may be suggested or performed automatically. Thus, as a result of the model 316 providing the impact and its state, a behavior change suggestion 322 may be made and or the user may be moved, to a different server (324).

Conventional systems may select users to be moved randomly or based on historic data, neither of which approach may result in accurate balancing based on actual user impact and current status of processing consumption. By selecting users based on the properties of their databases and their interaction with the databases, and combining behavior change suggestion with moving the user to another server, efficient balancing of processing consumption across servers may be achieved along with minimized impact on users (by moving the users that actually have the biggest impact, for example).

By distinguishing between long term and short term states, efficiency and cost of processing consumption balancing may be further enhanced. One or more algorithms may be employed fir different phases of the determination/selection. Results of the determinations and selections may be monitored and the algorithm(s) calibrated periodically or in real time. In some embodiments, the behavior change suggestions or move suggestions may be provided to a system administrator for manual implementation. In other embodiments, some or all of the behavior change suggestions as for move suggestions may be implemented automatically.

The examples provided in FIGS. 1 through 3 are illustrated with specific systems, services, applications, modules, and notifications. Embodiments are not limited to environments according to these examples. Adaptive selection of user to database mapping may be implemented in environments employing fewer or additional systems, services, applications, modules, and notifications. Furthermore, the example systems, services, applications, modules, and notifications shown in FIG. 1 through 3 may be implemented in a similar manner with other values using the principles described herein.

Figure 4:
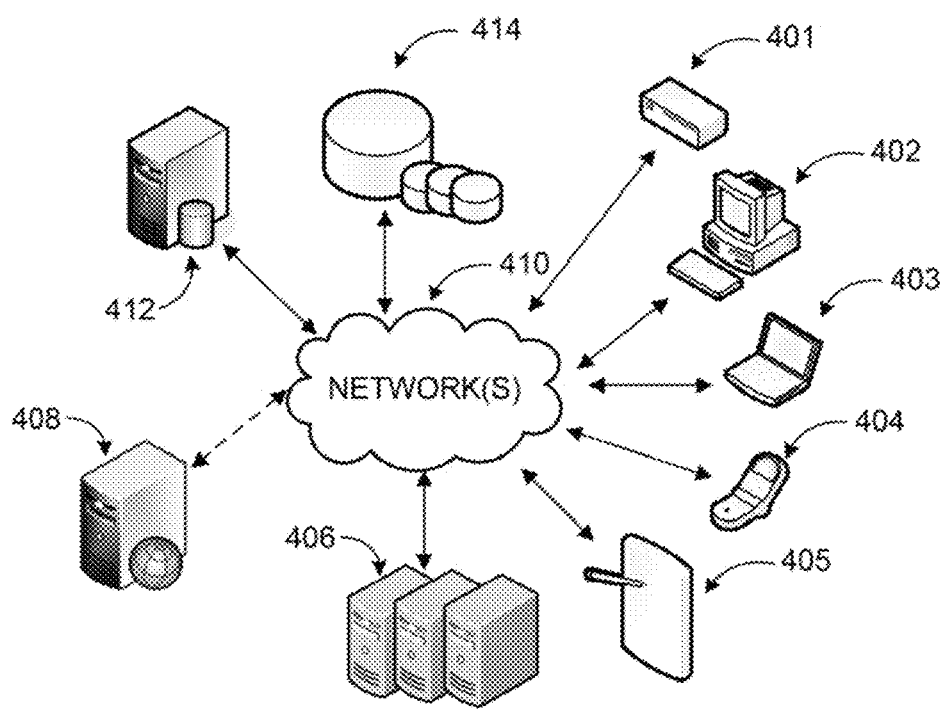
FIG. 4 is a networked environment, where a system according to embodiments may be implemented.

FIG. 4 is a networked environment, where a system according to embodiments may be implemented. In addition to locally installed applications (for example, client application 108), a load management module may also be employed in conjunction with hosted applications and services (for example, a communication service 118) that may be implemented via software executed over one or more servers 406 or individual server 408, as illustrated in diagram 400. A hosted service or application may communicate with client applications on individual computing devices such as a communal meeting device 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, networks) 410 may include wireless media such as acoustic, RF, infrared and other wireless media.

Many other configurations of computing devices, applications, engines, data sources, and data distribution systems may be employed for adaptive selection of user to database mapping. Furthermore, the networked environments discussed in FIG. 4 are for, illustration purposes only. Embodiments are not limited to the example applications, engines, or processes.

Figure 5:
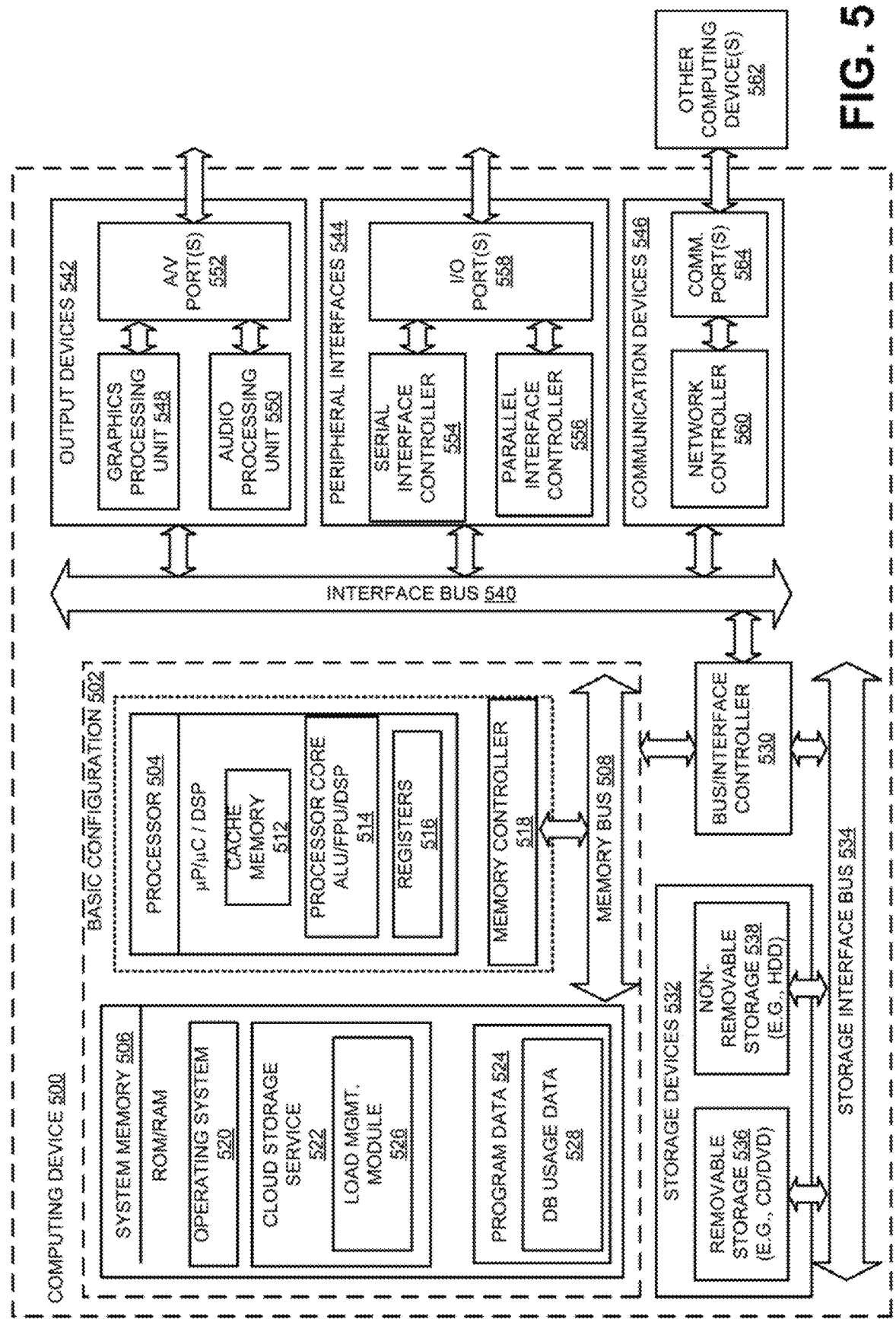
FIG. 5 is a block diagram of an example computing device, in accordance with some embodiments.
Figure 6:
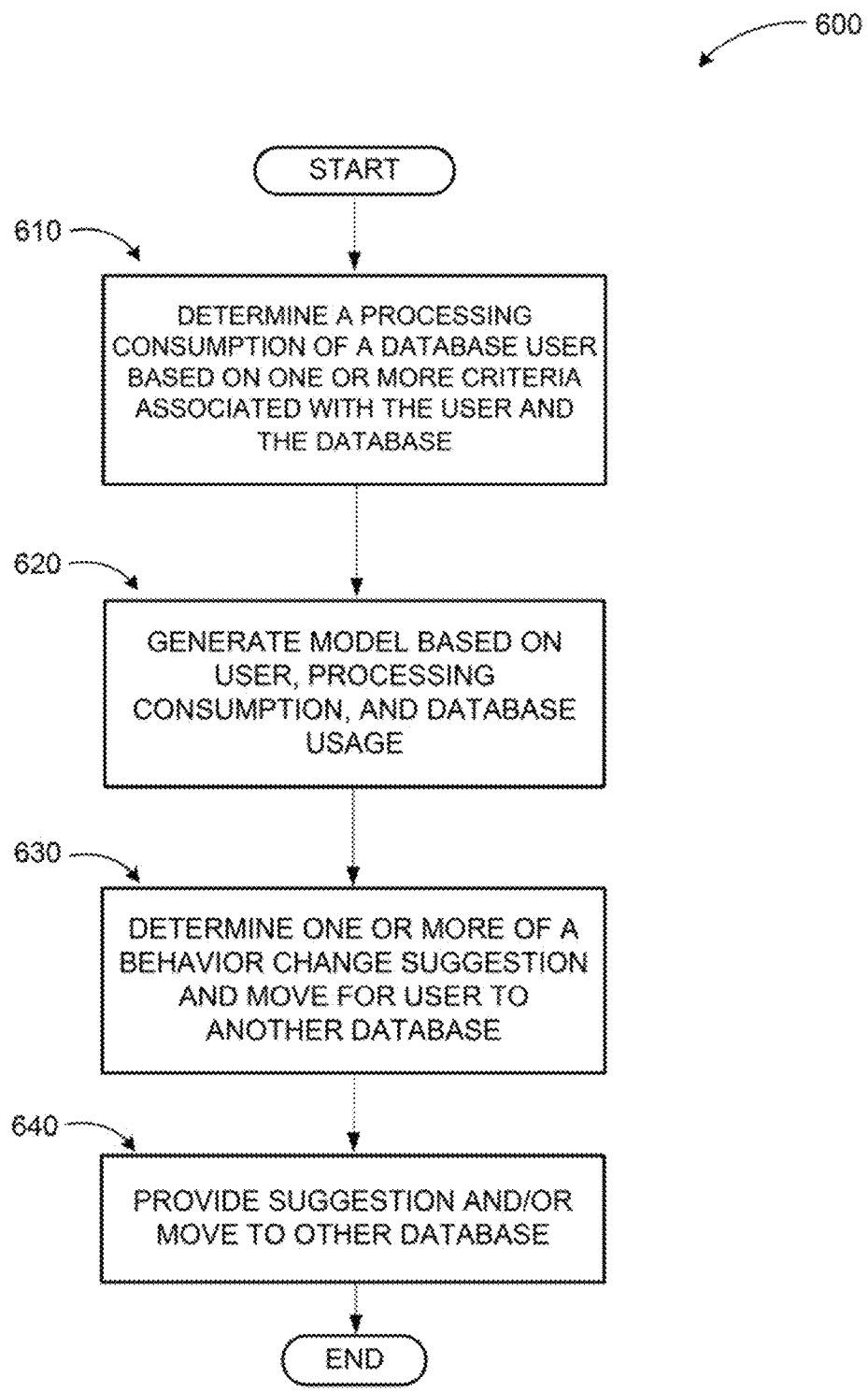
FIG. 6 illustrates a logic flow diagram of a method for providing adaptive selection of user to database mapping, according to embodiments.

FIG. 5 is a block diagram of an example computing device, in accordance with some embodiments.

For example, computing device 500 may be a server managing one or more databases in an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a cloud storage service 522, and program data 524. The cloud storage service 522 may include a load management module 526. The load management module 526 may determine a processing consumption of a database user based on one or more criteria associated with the user and the database. A model may be generated based on user, processing consumption, and database usage. The model may be used to determine one or more of providing a behavior change suggestion and moving the user to another database. The suggestion may then be provided to the user and/or the user may be moved to the other database. The program data 524 may include, among other data, database usage data 528, etc., as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs) optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CDROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing, unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a specialized server, mainframe, or similar computer that includes any of the above functions. The computing device 500 may also be implemented as a personal computer including both laptop computer and non-laptop computer configurations.

Example embodiments may also include methods for customizable and shared theme management. These methods can be implemented in any number of ways, including the structures described herein. One such way may be by machine operations, of devices of the type described in the present disclosure. Another optional way, may be for one or more of the individual operations of the methods to be, performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

FIG. 8 illustrates a logic flow diagram of a method for providing adaptive selection of user to database mapping, according to embodiments.

Process 800 may be implemented on a computing device, server, or other system. An example system may include a server configured to execute cloud storage service. The server may include a communication interface to facilitate communication between the cloud storage service and client devices accessing the service, a memory to store instructions, and one or more processors coupled to the memory.

Process 800 may begin with operation 810, where a processing consumption of a database user may be determined based on one or more criteria associated with the user and the database. The criteria may be based on user-database properties such as a number of rows in database (total), a number of rows in database for the user, a maximum depth of hierarchy for the user, a maximum breadth of hierarchy far the user, applications that have recently accessed the user's data, distribution of quota types in the user's data, last read time for the user, a number of shared items in the user's hierarchy, a number of people who share in the user's shared item hierarchy, an application employed by the user to access the data currently, etc.

At operation 820, a processing consumption impact model may be generated based on user, processing consumption, and database usage. The model may provide long term and short term states allowing a decision on user move based on the expected duration of the processing resource impact. At operation 830, the model may be used to determine one or more of providing a behavior change suggestion and moving the user to another database. At operation 840, the suggestion may be provided to the user and/or the user may be moved to the either database. The behavior change suggestion and the move suggestion may also be provided to an administrator, or, in some embodiments, automatically implemented.

The operations included in process 800 are for illustration purposes. Adaptive selection of user to database mapping may be implemented by similar processes with fewer or additional steps, as well as in different order of operations using the principles described herein. The operations described herein may be executed by one or more processors operated on one or more computing devices, one or more processor cores, and/or one or more specialized processing devices, among other examples.

According to examples, a means for adaptively selecting user to database mapping is described. The means may include a means for determining, a processing resource consumption of a database user based on one or more criteria associated with the user and the database; a means for generating a processing resource consumption model based on the user, the processing resource consumption, and a database usage; a means for determining one or more of a behavior change suggestion and, a move of the user to another processing resource; and a means for providing the behavior change suggestion and/or a move suggestion to one or more of the user and a system administrator.

According to some examples, a method for adaptive selection of user to database mapping is described. The method may include determining a processing resource consumption of a database user based on one or more criteria associated with the user and the database; generating a processing resource consumption model based on the user, the processing resource consumption, and a database usage; determining one or more of a behavior change suggestion and a move of the user to another processing resource; and providing the behavior change suggestion and/or a move suggestion to one or more of the user and a system administrator.

According to other examples, the method may further include determining a long term state and a short term state for an impact on the processing resource consumption based on the generated model; and determining whether one or both of the behavior change suggestion and the move suggestion are to be provided based on the long term state and the short term state. The method may also include if the impact on the processing resource consumption is dominant in the short term state, providing the behavior change suggestion; or if the impact on the processing resource, consumption is dominant in the long term state, providing the move suggestion.

According to further examples, the method may include also providing the behavior change suggestion. The method may further include automatically implementing one or both of the behavior change suggestion and the move suggestion. The method may also include automatically implementing the move suggestion if the user is unwilling or unable to implement the behavior change suggestion. The method may include monitoring a result of implementation of one or both cot the behavior change suggestion and the move suggestion; and calibrating one or both of the generation of the model and the determination of the behavior change suggestion or the move suggestion.

According to other examples, a server to provide adaptive selection of user to database mapping is described. The server may include a communication interface configured to facilitate communication between one or more servers executing a hosted service and one or more client devices; a memory configured to store instructions; and one or more processors coupled to the memory and the communication interface, where the one or more processors, in conjunction with the instructions stored in the memory, execute components of the hosted service. The components of the hosted service may include a load management module configured to determine a processing resource consumption of a user accessing a database within the hosted service based on one or more criteria associated with the user and the database; generate a processing resource consumption model based on the user, the processing resource consumption, and a database usage; determine one or more of a behavior change suggestion and a move of the user to another server; and provide the behavior change suggestion and/or a move suggestion to be implemented by the user, a system administrator, or automatically by the load management module.

According to some examples, the model may be generated to predict an impact of the database usage on the one or more processors based on one or more criteria. The one or more criteria may include a number of rows in the database, a number of rows in the database for the user, a maximum depth of hierarchy for the user, a maximum breadth of hierarchy for the user, applications that have recently accessed the user's data, a distribution of quota types in the user's data, a last read time for the user, a number of shared items in the user's hierarchy, a number of people who share in the user's shared item hierarchy, an application employed by the user to access the database currently.

According, to yet other examples, the suggested behavior change may include one or more of using a different application to access the database, modifying the distribution of quota types in the user's data, modifying the number of shared items in the user's hierarchy, modifying the number of people who share in the user's shared item hierarchy, reducing the number of rows in database for the user, reducing the maximum depth of hierarchy for the user, and reducing the maximum breadth of hierarchy for the user. The load management module may be further configured to employ one or more algorithms to generate the model and to determine the behavior change or the move to be suggested. The load management module may also be configured to monitor a result of the one or more algorithms; and calibrate the one or more algorithms based on the result. The move suggestion may be implemented by one of moving the user's data to an existing database at the other server or moving the user's data to a new database at the other server. The hosted service may be a cloud storage service, a collaboration service, a communication service, or a productivity service.

According to further examples, a system for providing adaptive selection of user to database mapping is described. The system may include a first server configured to execute a cloud storage service and a second server. The second server may include a communication interface configured to facilitate communication between the first server, the second server, and a plurality of computing devices; a memory configured to store instructions; and one or more processors coupled to the memory and the communication interface, where the one or more processors, in conjunction with the instructions stored in the memory, execute a load management module. The load management module may be configured to determine a processing resource consumption of a user accessing a database within the hosted service based on one or more criteria associated with the user and the database; generate a processing resource consumption model based on one or more criteria including a number of rows in the database, a number of rows in the database for the user, a maximum depth of hierarchy for the user, a maximum breadth of hierarchy for the user, applications that have recently, accessed the user's data, a distribution of quota types in the user's data, a last read time for the user, a number of shared items in the user's hierarchy, a number of people who share in the user's shared item hierarchy, an application employed by the user to access the database currently; determine one or more of a behavior change suggestion and a move of the user to another server; and provide the behavior change suggestion and/or a move suggestion to be implemented by the user, a system administrator, or automatically by the load management module.

According to yet further examples, the load management module may be further configured to generate the model for a plurality of users; and select one or more users among the plurality of users to move to another server based on the model. The load management module may also be configured to select the one or more users to move to the other server based on a long term state and a short term state of the model. The load management module may be further configured to present an incentive to the user to implement the behavior change suggestion.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for adaptive selection of user to database mapping, the method comprising:
   determining a processing resource consumption of a database user based on criteria associated with the user and a database stored on a first processing resource;
   generating a processing resource consumption model based on the processing resource consumption;
   determining a user behavior change suggestion based on the processing resource consumption model, the user behavior change suggestion suggesting a change to behavior of the user and including at least one selected from a group consisting of a suggested change to a different application usable by the user for accessing the database, a suggested change to data types included in the database, a suggested change to a number of rows included in the database, a suggested change to number of items included in the database shared with other users, and a suggested change to a hierarchy for the user; and
   providing the user behavior change suggestion to at least one selected from a group consisting the user and a system administrator.

2. The method of claim 1, further comprising:
   determining a long term state and a short term state for an impact on the processing resource consumption based on the generated model.

3. The method of claim 2, wherein providing the user behavior change suggestion includes providing the user behavior change suggestion in response to the impact on the processing resource consumption being dominant in the short term state.

4. The method of claim 2, further comprising:
   in response to the impact on the processing resource consumption being dominant in the long term state, providing the move suggestion to at least one selected from a group consisting of the user and the system administrator, the move suggestion suggesting moving at least a portion of the data included in the database to a different database.

5. The method of claim 1, further comprising:
   automatically implementing the user behavior change suggestion.

6. The method of claim 5, further comprising:
   determining a move suggestion based on the processing resource consumption model; and
   automatically implementing the move suggestion if user behavior change suggestion is not implemented, wherein implementing the moving suggestion comprises moving at least a portion of data from the database to a different database.

7. The method of claim 1, further comprising:
   monitoring a result of implementation of the user behavior change suggestion; and
   calibrating at least one selected from a group consisting of the generation of the model and the determination of the user behavior change suggestion based on the monitoring.

8. A server to provide adaptive selection of user to database mapping, the server comprising:
   a communication interface configured to facilitate communication between one or more servers executing a hosted service and one or more client devices;
   a memory configured to store instructions; and
   one or more processors coupled to the memory and communication interface, wherein the one or more processors, in conjunction with the instructions stored in the memory, execute components of the hosted service, the components of the hosted service including a load management module configured to:
      determine a processing resource consumption of a user accessing a database stored on a first processing resource within the hosted service based on criteria;
      generate a processing resource consumption model based on the processing resource consumption;
      determine a move suggestion based on the processing resource consumption model, wherein the move suggestion comprises a suggestion to move the user and the database from the first processing resource to a second processing resource different from the first processing resource; and
      implement the move suggestion by moving the user's data stored in the database to at least one selected from a group consisting of an existing database at the second processing resource or a new database at the second processing resource.

9. The server of claim 8, wherein the model is generated to predict an impact of the database usage on the one or more processors based on the criteria.

10. The server of claim 9, wherein the criteria includes at least one selected from a group consisting of a number of rows in the database, a number of rows in the database for the user, a maximum depth of hierarchy for the user, a maximum breadth of hierarchy for the user, a distribution of quota types in the user's data, a number of shared items in the user's hierarchy, and a number of people who share in the user's shared item hierarchy.

11. The server of claim 8, wherein the load management module is further configured to determine a user behavior change suggestion, wherein the user behavior change suggestion suggests a change to behavior of the user and includes at least one selected from a group consisting of a suggested change to a different application usable by the user for accessing the database, a suggested change to a distribution of quota types in the user's data, a suggested change to a number of shared items in the user's hierarchy, a suggested change to a number of people who share in the user's shared item hierarchy, a suggested change to reduce a number of rows in database for the user, a suggested change to reduce a maximum depth of hierarchy for the user, and suggested change to reduce a maximum breadth of hierarchy for the user.

12. The server of claim 8, wherein the load management module is further configured to:
employ one or more algorithms to generate the model and to determine the move suggestion.

13. The server of claim 12, wherein the load management module is further configured to:
monitor a result of the one or more algorithms; and
calibrate the one or more algorithms based on the result.

14. The server of claim 8, wherein the hosted service is one of a cloud storage service, a collaboration service, a communication service, and a productivity service.

15. A system for providing adaptive selection of user to database mapping, the system comprising:
a first server and a second server configured to execute a cloud storage service; and
a third server comprising
a communication interface configured to facilitate communication between the first server, the second server, the third server, and a plurality of computing devices;
a memory configured to store instructions; and
one or more processors coupled to the memory and communication interface, wherein the one or more processors, in conjunction with the instructions stored in the memory, execute a load management module configured to:
determine a processing resource consumption of a user accessing a database stored on the first server within the cloud storage service;
generate a processing resource consumption model based on criteria, the criteria including at least one selected from a group consisting of a number of rows in the database, a number of rows in the database for the user, a maximum depth of hierarchy for the user, a maximum breadth of hierarchy for the user, a distribution of quota types in the user's data, a number of shared items in the user's hierarchy, and a number of people who share in the user's shared item hierarchy;
determine, based on the processing resource consumption model, at least one selected from a group consisting of a user behavior change suggestion and a move suggestion, wherein the move suggestion comprises a suggestion to move the user and the database from the first server to the second server and wherein the user behavior change suggestion suggesting a change to behavior of the user and including at least one selected from a group consisting of a suggested change to data included in the database, a suggested change to a different application useable by the user to access the data included in the database, and a suggested change to a hierarchy of the user; and
implement at least one selected from the group consisting of the user behavior change suggestion and the move suggestion.

16. The system of claim 15, wherein the load management module is further configured to:
generate the model for a plurality of users; and
select one or more users among the plurality of users to move to another server based on the model.

17. The system of claim 16, wherein the load management module is further configured to:
select the one or more users to move to the other server based on a long term state and a short term state of the model.

18. The system of claim 15, wherein the load management module is further configured to:
present an incentive to the user to implement the user behavior change suggestion.

\* \* \* \* \*